United States Patent [19]

Pannekoek et al.

[11] Patent Number: 4,748,464

[45] Date of Patent: May 31, 1988

[54] IMAGE-FORMING ELEMENT FOR AN ELECTROSTATIC PRINTER HAVING ELECTRODES IN THE FORM OF A GRID

[75] Inventors: Reinder Pannekoek, Venlo; Adrianus J. M. van Genuchten, Grubbenvorst; Peter G. La Vos, Baarlo, all of Netherlands

[73] Assignee: Oce-Nederland B.V., Venlo, Netherlands

[21] Appl. No.: 43,877

[22] Filed: Apr. 29, 1987

[30] Foreign Application Priority Data

May 29, 1986 [NL] Netherlands .......................... 8601376

[51] Int. Cl.[4] .............................................. G01J 15/10

[52] U.S. Cl. .................................. 346/155; 346/153.1

[58] Field of Search ................ 346/153.1, 155, 139 C, 346/76 PH, 162, 163; 400/119; 10/DIG. 13; 358/300

[56] References Cited

U.S. PATENT DOCUMENTS 4,397,085 8/1983 Goff, Jr. et al. .................... 346/155

*Primary Examiner*—Arthur G. Evans

*Attorney, Agent, or Firm*—Reed Smith Shaw & McClay

[57] ABSTRACT

An image-forming element for an electrostatic printer is provided with an endless support having thereon a dielectric surface layer with image-forming electrodes beneath the surface of the dielectric layer. The image-forming electrodes comprise two groups, the first group being insulated from one another and extending parallel to one another in the peripheral direction of the support in the form of endless paths. Beneath the first group of electrodes, a second group of electrodes is provided also being insulated from one another and extending parallel to one another from one end of the support in the direction of the other end of the support. In each case, one of the electrodes of the first group is electrically connected to one of the electrodes of the second group. A voltage means for supplying voltage to the image-forming electrodes of the second group is also provided.

9 Claims, 1 Drawing Sheet

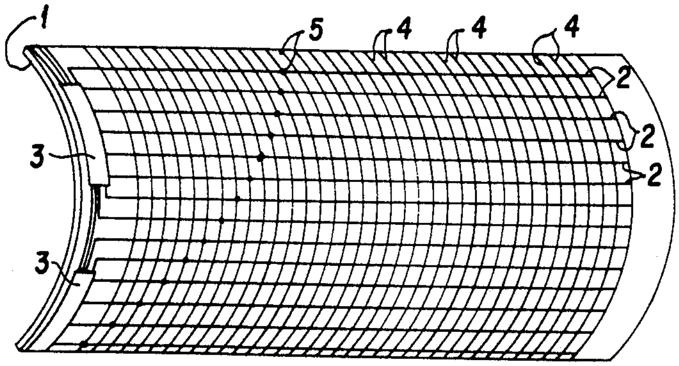
FIG. 1
FIG. 2
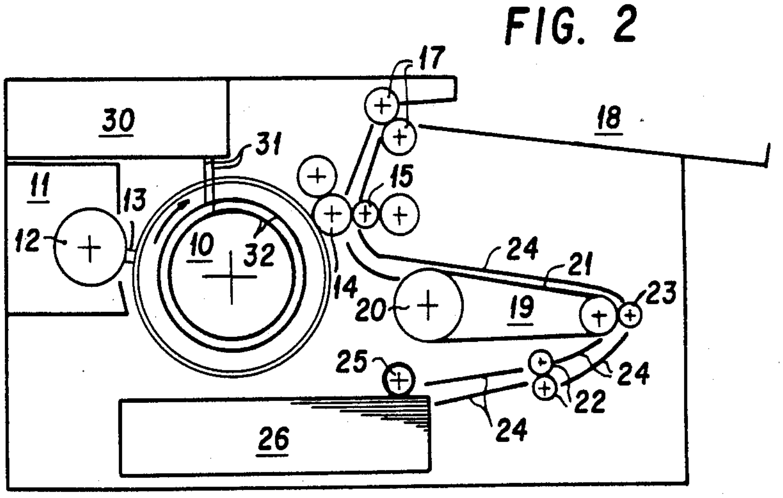

IMAGE-FORMING ELEMENT FOR AN ELECTROSTATIC PRINTER HAVING ELECTRODES IN THE FORM OF A GRID

FIELD OF THE INVENTION

The present invention relates to an image-forming element for an electrostatic printer, consisting of an endless support with electrodes and a dielectric surface layer thereon.

BACKGROUND OF THE INVENTION

U.S. Pat. No. 3,816,840 describes an electrostatic printing process and printer in which a dielectric image-receiving material is fed between a first and a second electrode which are disposed a short distance apart. One of the electrodes is covered with a layer of magnetically attractable electrically conductive toner powder. Voltage pulses are applied between the electrodes so that toner powder is deposited on the image-receiving material in the form of an information pattern. A disadvantage of this process is that only dielectric image-receiving material can be used, thereby restricting the choice of usable image-receiving materials.

U.S. Pat. No. 3,946,402 describes an electrostatic printer comprising a rotatable drum provided with a dielectric layer on which a uniform layer of electrically conductive magnetically attractable toner powder is applied. A magnetic roller is disposed in an image-forming zone near the drum surface covered with toner powder and has a stationary nonmagnetic sleeve and a rotatable magnet system mounted inside the sleeve. A large number of magnetic electrodes in the form of rods each connected to a voltage supply are disposed axially on the sleeve of this magnetic roller. When the electrodes are not energized, toner powder is attracted from the drum surface to the magnetic roller. No toner powder is attracted when the electrodes are energized. By energizing the electrodes pulse-wise according to an information pattern, a toner image corresponding to the information pattern is formed on the drum and can then be transferred to a receiving support.

Since the electrodes are conductive they must be insulated from one another. A disadvantage of this device is that the conductive toner powder can short-circuit some electrodes and thus disturb the image formation. Another disadvantage is that it is a very complex and expensive matter to construct the row of fine magnetic electrodes in rod form used in this device.

Japanese Application No. 59-224368 shows an image-forming element with a rectangular grid of electrodes. The grid is made from two groups of parallel electrodes with each group being perpendicular to the other. There are no electrical connections between the two groups of electrodes forming the grid. Moreover, both groups of electrodes are attached to a power source and both groups must be activated to generate a sufficient potential to attract toner particles at the point where the overlying electrodes cross.

Japanese Application No. 59-224369 shows an image-forming element comprising an endless support with an insulating layer and a multiplicity of electrodes embedded in the insulating layer. Preferably, the electrodes form rings around the circumference of the support and are selectively electrified from within the support. Only one set of electrodes is provided in this device.

U.S. Pat. No. 3,739,087 shows a recording element consisting of a cylindrical wall of insulating material with a multiplicity of electrodes extending through the cylindrical wall. One disadvantage of this arrangement is that if conductive toner is used, it can form a bridge between the ends of the electrodes and short-circuit some of them, thereby disturbing the image formation.

Accordingly there is a need for an image-forming element for an electrostatic printer which obviates the above-mentioned disadvantages.

SUMMARY OF THE INVENTION

Generally the present invention provides an image-forming element for an electrostatic printer consisting of an endless support with a dielectric surface layer thereon wherein a plurality of image-forming electrodes are provided beneath the dielectric surface layer. The image-forming electrodes comprise two grups of electrodes. The first group of electrodes extends in the form of endless paths parallel to one another in the peripheral direction of the support and are insulated from one another. The second group of electrodes is provided beneath the first group of electrodes. The second group extends transversely from a point near one end of the support in the direction of the other end of the support and are insulated from one another. Each electrode in the second group is electrically connected to one and only one of the electrodes in the first group. Each electrode of the second group is also connected to a voltage means for supplying voltage to the image-forming electrodes.

In the image-forming element according to the present invention, the image-forming electrodes in both groups are completely insulated from one another so that short-circuiting of one or more electrodes by the applied electrically conductive toner is eliminated. Since the image-forming electrodes are disposed in the image-forming element itself, a conventional magnetic roller can be used in the image forming process. This results in a simpler and cheaper construction in addition to better copy quality.

The voltage means for energizing the electrodes in accordance with an information pattern which is to be printed, is preferably disposed on the surface of the support near one or both ends and on the periphery thereof. As a result, the voltage means can be installed fairly simply, and, what is particularly important, it is readily accessible for maintenance or for the replacement of any faulty components.

Other advantages of the present invention will become apparent from the following detailed description and accompanying drawings of a presently preferred embodiment of the best mode of carrying out the invention.

BRIEF DESCRIPTION OF THE DRAWINGS

FIG. 1 is a diagrammatic view of an image-forming element according to the present invention.

FIG. 2 shows an electrostatic printer equipped with an image-forming element according to the present invention.

DESCRIPTION OF THE PREFERRED EMBODIMENT

The image-forming element as shown in FIG. 1 comprises a drum 1 having an insulating surface on which are disposed a plurality of image-forming electrodes comprising a second group 2 and a first group 4. The second group of electrodes 2 extends axially on drum 1.

Each electrode 2 is connected to one of the blocks 3 which are disposed on one side of the surface of drum 1, outside the image-forming zone. Blocks 3 represent the voltage means for selectively applying voltage to electrodes 2 in accordance with an information pattern.

Electrodes 2 are covered with an insulating layer which is not shown in FIG. 1 for the sake of clarity. The first group of electrodes 4 are disposed on this insulating layer and extend annularly in the direction of the periphery of drum 1 in the form of endless paths parallel to and equidistant from one another. One electrode 4 of the first group is electrically connected to one and only one electrode 2 of the second group via perforations in the intermediate insulating layer. The perforations are filled with conductive material to make the electrical connection. The conductive connections are shown as dots 5 in FIG. 1. That part of drum 1 which is covered with electrodes 4 is covered with a dielectric layer which again is not shown in FIG. 1 for the sake of clarity. Apart from the conductive connections 5, the image-forming electrodes (i.e., groups 2 and 4) are completely insulated from one another.

The number of electrodes 2 on drum 1 in the second group is equal to the number of electrodes 4 in the first group with the result that each electrode 2 is conductively connected to only one electrode 4. The quality of the images formed on the image-forming element depends, inter alia on the number of electrodes 4 in the first group. As the electrode density increases, the image quality improves. The number of electrodes 4 in the first group is at least ten per millimeter, and preferably fourteen to twenty per millimeter. In one embodiment, the number of electrodes 4 is equal to sixteen per millimeter and each electrode has a width of about 40 micrometers. The distance between the electrodes in this embodiment is about 20 micrometers.

Blocks 3 each comprise a plurality of integrated circuits known, for example, from video display techniques. Typically these integrated circuits comprise a serial-in parallel-out shift register, an output register and drivers having a voltage range of 15 to 25 volts. Each electrode 2 is connected to a driver of one of the integrated circuits in blocks 3. The number of blocks 3 depends on the number of electrodes 2.

The image-forming element according to the present invention can be made by applying an electrically conductive first metal layer such as copper to a drum having an insulating surface, or having a conductive surface provided with an insulating layer, in a known manner such as by vapor-coating or electroplating. This metal layer can then be converted to a pattern of electrodes 2 extending transversely by the use of a known photo-etch technique. That part of the drum surface on which the peripherally extending electrodes 4 should be disposed is then covered with an insulating layer and perforations are formed in this insulating layer by burning-in with a laser beam at the places where the electrically conductive connections 5 are to be formed between electrodes 2 of the second group and the still-to-be-applied electrodes 4 of the first group.

Alternatively, the perforations may be formed photographically by covering the drum surface with a light-sensitive layer of varnish, exposing this layer of varnish to light except for the places where the electrically conductive connections are to be formed, and removing the unexposed parts of the layer of varnish by means of a suitable solvent to form perforations. The exposed layer of varnish then acts as an insulating intermediate layer. After the perforations have been formed in the insulating layer, a conductive second metal layer is applied over this insulating layer such that the perforations are filled at the same time. This metal layer can be applied in the same way and can consist of the same material as the metal layer from which electrodes 2 were formed. Peripherally extending electrodes 4 are then formed from this metal layer such as by using a known photo-etch technique.

Each electrode 4 is formed where an electrical connection is achieved between the second metal layer and electrodes 2 situated there-beneath. Finally, that part of drum 1 provided with electrodes 4 is covered with a smooth dielectric layer so that the image-forming electrodes are completely insulated from one another. Blocks 3 for selectively controlling the image-forming electrodes are then secured to the side of the drum by known fixing techniques.

The insulating layer which separates electrodes 2 of the second group from electrodes 4 of the first group is of a thickness of at least 5 micrometers and has a breakdown voltage of 100 V or more. The layer can be formed with various known insulating materials. A suitable material for forming this insulating layer is an epoxy resin such as Epo-tek type 360 or 353 ND made by Epoxy Technology Inc. The dielectric top layer applied over electrodes 4 preferably has a thickness of just a few tenths of a micrometer (i.e. 0.2 to 0.8 micrometers). Suitable dielectric materials for forming this layer are known, inter alia, from microelectronics.

In the embodiment of the present invention shown in FIG. 1, blocks 3 for controlling the image-forming electrodes are disposed along one side of drum 1. It will be apparent that blocks 3 can be distributed over both sides of drum 1. The fact that the electronic components are disposed on the outer surface of drum 1 has the advantage that they are readily accessible and can therefore readily be replaced in the event of a fault. It is also possible to dispose the voltage means, i.e., the electronics for controlling the image-forming electrodes inside drum 1 and to connect electrodes 2 to the voltage means via the sides of drum 1 by separate connecting leads.

Electrodes 2, which extend transversely to drum 1 need not extend axially nor need they cover the entire image-forming area of drum 1. They only need to extend to the place where the electrically conductive connection is established with electrode 4 thereabove.

FIG. 2 diagrammatically illustrates a printer equipped with an image-forming element 10 according to the present invention. In an image-forming station 11, a magnetic roller 12 is disposed a short distance from the surface of image-forming element 10. Magnetic roller 12 comprises a rotatable electrically conductive nonmagnetic sleeve and an internal stationary magnet system. The rotatable sleeve of magnetic roller 12 is covered with a uniform layer of electrically conductive and magnetically attractable toner powder which in an image-forming zone 13 is in contact with image-forming element 10. By applying a voltage between magnetic roller 12 and one or more of the selectively controllable image-forming electrodes of image-forming element 10, a powder image is formed on image-forming element 10. This powder image is transferred by pressure to a heated rubber-cover transfer roller 14.

From a stock pile 26, a sheet of paper is taken by roller 25 and fed via guideways 24 and rollers 22, 23 to a heating station 19. Heating station 19 comprises a belt 21 trained about a heated roller 20. The sheet of paper is heated by contact with belt 21. The sheet heated in this way is then fed through rollers 14 and 15 where the softened image present on transfer roller 14 is completely transferred to the sheet of paper. The temperatures of belt 21 and roller 14 are adjusted to one another so that the image fuses on the sheet of paper. The sheet of paper provided with the image is then fed via conveyor roller 17 to a tray 18.

Unit 30 comprises an electronic circuit which converts the optical information of an original into electrical signals which are fed via leads 31 and conductive tracks 32 to blocks 3. Preferably, leads 31 have slide contacts which connect to conductive tracks 32 in the insulating side wall of image-forming element 10. Conductive tracks 32 are connected to blocks 3.

The image information is fed serially, line by line, to the voltage means, i.e., to the shift registers of the integrated circuits in blocks 3. If the shift registers are completely filled in accordance with the information of one line, that information is put into the output registers and electrodes 2, 4 are selectively actuated via the drivers depending upon the image information signal. While one line is being printed the information of the next line is being fed to the shift registers.

Apart from optical information originating from an original, electrical signals originating from a computer or a data processing device can also be converted in unit 30 to signals which are fed to the voltage means, i.e., blocks 3.

In the printer shown in FIG. 2, the electrically conductive magnetically attractable toner powder is fed to image-forming zone 13 by magnetic roller 12. It is understood that the toner powder can also be applied in a uniform layer to image-forming element 10 and then selectively be removed therefrom in image-forming zone 13 as described in the above-mentioned U.S. Pat. No. 3,946,402.

While a presently preferred embodiment of the invention had been shown and described with particularity, the invention may be otherwise embodied within the scope of the appended claims.

What is claimed is:

1. An image-forming element for an electrostatic printer comprising: an endless support with a dielectric surface layer thereon; a plurality of first electrodes provided beneath the dielectric surface layer, the first electrodes being insulated from one another and extending in the form of endless paths parallel to one another in the peripheral direction of the support; a plurality of second electrodes provided beneath the first electrodes, the second electrodes being insulated from one another, extending from a point near one end of the support in the direction of the other end of the support, and being electrically connected to only one of the first electrodes; and a voltage means for supplying voltage to the second electrodes.

2. An image-forming element as described in claim 1 wherein the second electrodes extend in an axial direction on the support.

3. An image-forming element as described in claim 2 wherein an insulating layer is located between the first electrodes and the second electrodes.

4. An image-forming element as described in claim 1 wherein an insulating layer is located between the first electrodes and the second electrodes.

5. An image-forming element as described in claim 1 wherein the voltage means is disposed on the surface of the endless support outside the image-forming zone.

6. A device for printing information comprising: a movable image-forming element as described in claim 1; an image-forming station situated along the trajectory of the image-forming element wherein a magnetic roller with an electrically conductive sleeve is disposed near the surface of the image-forming element; and a means for generating an electric field between the image-forming element and the magnetic roller according to an information pattern while electrically conductive magnetically attractable toner powder is fed between the image-forming element and the magnetic roller.

7. A device as described in claim 6 wherein the second electrodes of the moveable image-forming element extend in an axial direction on the endless support.

8. A device as described in claim 7 wherein an insulating layer is located between the first electrodes and the second electrodes of the movable image-forming element.

9. A devic as described in claim 8 wherein the voltage means is disposed on the surface of the endless support outside the image-forming zone.

* * * * *

UNITED STATES PATENT AND TRADEMARK OFFICE

CERTIFICATE OF CORRECTION

PATENT NO. : 4,748,464

DATED : May 31, 1988

INVENTOR(S) : Pannekoek et al.

It is certified that error appears in the above—identified patent and that said Letters Patent is hereby corrected as shown below:

Column 2, line 15: please delete --grups-- and substitute "groups" therefor.
Column 4, line 34: please insert "also" after "can".
Column 6, line 42: please delete --devic-- and substitute "device" therefor.

Signed and Sealed this

Fifteenth Day of November, 1988

*Attest:*

DONALD J. QUIGG

*Attesting Officer*

*Commissioner of Patents and Trademarks*